United States Patent [19]

Meyer

[11] Patent Number: 4,507,621
[45] Date of Patent: Mar. 26, 1985

[54] GENERATING QUASI-RANDOM SEQUENCES IN AMI CODE

[75] Inventor: Fritz Meyer, Germering, Fed. Rep. of Germany

[73] Assignee: Siemens Aktiengesellschaft, Berlin & Munich, Fed. Rep. of Germany

[21] Appl. No.: 500,947

[22] Filed: Jun. 3, 1983

[30] Foreign Application Priority Data

Jun. 30, 1982 [DE] Fed. Rep. of Germany ....... 3224442

[51] Int. Cl.³ .............................................. H03B 29/00
[52] U.S. Cl. ...................................... 331/78; 364/717; 375/17; 375/20; 307/269
[58] Field of Search ........................... 331/78; 364/717; 307/260, 269; 375/17, 20

[56] References Cited

U.S. PATENT DOCUMENTS 3,965,294 6/1976 Renz et al. ......................... 375/17 X
4,071,692 1/1978 Weir et al. ......................... 375/20 X
4,423,518 12/1983 Hirosaki ............................. 307/269 X Primary Examiner—Eugene R. LaRoche
Assistant Examiner—Robert J. Pascal
Attorney, Agent, or Firm—Hill, Van Santen, Steadman & Simpson

[57] ABSTRACT

In order to test coding rule infraction test units for AMI code which are employed for surveillance of digital transmission circuits, an arrangement is provided which generates quasi-random sequences in the AMI code without employing a spur line short-circuited at its end. Previously, no coding rule infractions could be mixed into the generated signals with such a spur line usually employed for generating signals in the AMI code. With the disclosed arrangement a generator for binary quasi-random sequences is provided to whose output one input of a differential amplifier arrangement is directly connected. Another input of the differential amplifier arrangement is connected via a series connection of an exclusive OR element and a time-delay element. Noise pulses which lead to coding rule infractions in the generated output signals can be mixed in via the other input of the exclusive OR element.

4 Claims, 3 Drawing Figures

GENERATING QUASI-RANDOM SEQUENCES IN AMI CODE

BACKGROUND OF THE INVENTION

The invention relates to an arrangement for generating quasi-random sequences in AMI code by use of a generator for binary quasi-random sequences.

The surveillance of transmission circuits for digital signals frequently involved monitoring transmitted digital signals at individual locations of the transmission circuits for infractions of the coding rule employed in the formation of the digital signals. These coding rule infractions arise due to transmission errors. It is a precondition for an identification of coding rule infractions that a redundant code exists which allows infractions of the coding rule to be perceived. A code frequently employed in the transmission of digital signals is the so-called AMI code which is a pseudoternary code in which successive one characters are transmitted by means of pulses having alternating polarity, whereas zero characters are allocated to the zero level.

A problem in the surveillance of transmission circuits for digital signals through investigation of such signals for coding rule infractions or violations is the occasional check of the coding rule infraction test units contained at specific locations in the transmission circuit. For this check, for example, AMI-coded test signals are required which are locally generated in response to an additionally transmitted signal. The AMI-coded test signals are also required in a final check after a manufacture of regenerators having code infraction test units.

The generation of AMI-coded signals usually occurs by connecting a spur line in parallel to the output of a generator for test signals present in the differential binary code. Such a spur line is short-circuited at the end and its single signal transit time corresponds to half the bit duration of the signals to be reshaped. A negative pulse, which appears at the input of the spur line one bit duration after the positive pulse, is generated by means of reflection of a positive pulse, for example, at the short-circuited end of the spur line. Such a technique for generating AMI-coded signals, however, is not suitable for generating test signals since the observation of the AMI coding rule is induced by the employment of a spur line whereas the test signals must contain a specific plurality of coding rule infractions.

SUMMARY OF THE INVENTION

An object of the present invention is to discover a possibility for generating AMI-coded test signals with a specific plurality of coding rule infractions so that the test signals should exist in the form of quasi-random sequences for the execution of an optimum test.

This object is achieved in that the first input of a differential amplifier arrangement and the one input of an exclusive OR gate are connected to an output of the clocked generator for binary quasi-random sequences. The other input of the exclusive OR gate is connected to a control terminal. The output of the exclusive OR gate is connected over a time-delay element to the second input of the differential amplifier arrangement. The differential amplifier arrangement contains two emitter-coupled differential amplifiers. The first of the differential amplifiers has two npn transistors whose emitters are connected to one another and, over a first current source, are connected to a terminal for the negative operating voltage. The base terminal of the first transistor is connected to the first input of the differential amplifier arrangement and the base terminal of the second transistor is connected to a reference voltage source. The collector terminal of the first transistor is connected to an output for the inverse output signal and, over a first resistor, is connected to a reference potential. The collector terminal of the second transistor is connected to a signal output and, over a second resistor, is connected to the reference potential. The second differential amplifier has a third and a fourth npn transistor whose emitter terminals are connected to one another and, over a second current source, are connected to the negative operating voltage. The collector terminal of the third transistor is connected to the collector terminal of the second transistor and the collector terminal of the fourth transistor is connected to the collector terminal of the first transistor. The base terminal of the fourth transistor is connected to the base terminal of the second transistor and the base terminal of the third transistor is connected to the second input of the differential amplifier arrangement.

The invention offers a series of advantages. The arrangement is easy to integrate overall. The system also has a low power requirement given a simple structure.

In order to generate sufficiently powerful test signals where such signals are subjected to cable attenuation before being supplied to the generator, in a further development of the invention, the two load resistors are replaced by a single load resistor having a preceding line transformer. The line transformer comprises two two-wire lines of equal length. The first two-wire line is wound on a highly permeable core and a first lead of the first two-wire line is connected at one side to the output terminal for the complementary output signal and, at the other side, is connected to the reference potential. The second lead of the first two-wire line is connected to the reference potential over a first terminal adjacent to the first terminal of the first lead and is connected over a second terminal to the shared load resistor as well as to a second terminal of the first lead of the second two-wire line. The first terminal of the first lead of the second two-wire line is connected to the output terminal for the output signal. The two terminals of the second lead of the second two-wire line are connected to the reference potential. The terminals of the individual leads are respectively provided at the ends of the two-wire lines.

A modification of the invention is suited for employment with low frequencies, the time-delay element being realized by means of an electrical circuit arrangement, particularly by a clocked shift register.

DESCRIPTION OF THE PREFERRED EMBODIMENTS

Figure 1:
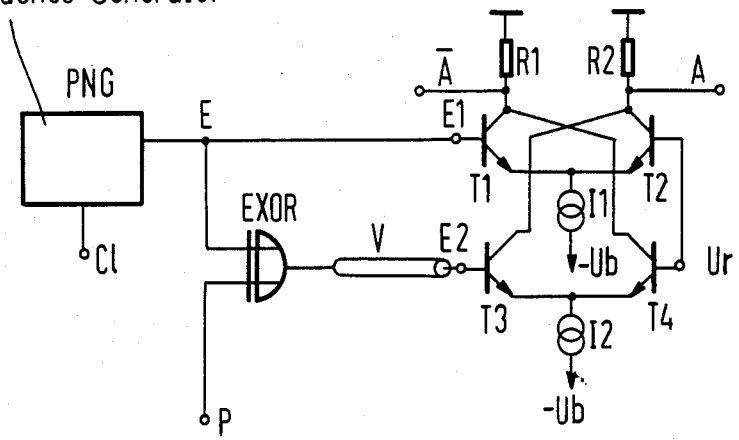
FIG. 1 illustrates the circuit diagram of an inventive arrangement for generating quasi-random sequences in AMI code with a modification in FIG. 1a for generating higher power output pulses.

The arrangement for generating quasi-random sequences in AMI code according to FIG. 1 contains a generator PNG for generating binary quasi-random sequences which receives a clock signal over a terminal C1. The one terminal of an exclusive OR element EXOR as well as a first input E1 of a differential amplifier arrangement are connected to the output E of the generator PNG. The differential amplifier arrangement contains two emitter-coupled differential amplifiers, whereby the first differential amplifier contains a first and a second npn transistor T1, T2 whose emitter terminals are connected to one another and, over a current source I1 in the form of a resistor, is connected to a terminal for the operating voltage −Ub. The collector terminal of the first transistor T1 is connected to an output terminal $\overline{A}$ for the inverse output signal and, over a first resistor R1, is connected to the reference potential. The collector terminal of the second transistor T2 is connected to an output terminal A for the non-inverted output signal and, over a second resistor R2, is connected to the reference potential. The second differential amplifier of the differential amplifier arrangement contains a third and a fourth npn transistor T3, T4 whose emitter terminals are likewise connected to one another and, via a current source for the current I2, are connected to a terminal for the operating voltage −Ub. The collector terminal of the third transistor T3 is connected to the collector terminal of the second transistor T2, and the collector terminal of the fourth transistor T4 is connected to the collector terminal of the first transistor T1. The base terminals of the second transistor T2 and of the fourth transistor T4 are connected to one another and to a source for a reference voltage Ur, whereby said reference voltage lies between the two logical levels of the input signal.

The other terminal of the exclusive OR element EXOR is connected to an input P to which external signals are supplied by means of which the coding rule infractions are to be triggered in the generated AMI-coded quasi-random sequence. The second input E2 of the differential amplifier arrangement which corresponds to the base terminal of the third transistor T3 is connected to the output terminal of the exclusive OR element over a time-delay element V. At low bit rates, the time-delay element V is realized by an electronic delay unit. At high bit rates, a line matched in terms of its characteristic impedance is provided as the time-delay element V.

The function of the circuit arrangement according to FIG. 1 is as follows. The quasi-random sequence generator PNG generates a binary quasi-random pulse sequence which is supplied to the differential amplifier arrangement. The sequence is supplied directly on the one hand and delayed on the other hand by the exclusive OR element and the time-delay element. The overall time-delay in the exclusive OR element and in the time-delay element thereby corresponds to a bit duration of the binary signals generated by the generator PNG. The conversion of the binary quasi-random sequence into an AMI-coded quasi-random sequence ensues in the differential amplifier arrangement, said AMI-coded quasi-random sequence being taken directly at the output terminal A or, in inverse form, at the output terminal $\overline{A}$.

Since binary signals have been generated by the generator PNG, the signals at the inputs E1 and E2 of the differential amplifier arrangement can assume the logical statuses 0 and 1, whereby the status 1 is allocated to the higher potential. The signals at the input terminals E1 and E2 can form four different combinations which produce three different logical statuses at the signal output A. Capable of occurring as the first combination of the binary signals is the case where the logical level at the first input E1 is at the value 1, whereas the 0 level is present at the other input E2. This leads to a positive 1 level at the output terminal A. In a second case, the logical 1 level can be adjacent to the second input E2 whereas the 0 level corresponds to the lowest and the positive 1 level corresponds to the highest potential.

Given the first case described above, namely that the logical 1 level is adjacent to the first input E1 and the logical zero level is adjacent to the other input E2, the transistors T1 and T4 are conductive. Consequently, both the current I1 as well as the current I2 flow through the first resistor R1, whereas the second resistor R2 remains nearly current-free and the highest potential and thus the status +1 therefore occurs at this resistor. When the 0 potential is at the input E1 and the one potential is at the input E2, then the transistors T2 and T3 are correspondingly conductive so that both currents then flow through the second resistor R2 and the lowest potential corresponding to the −1 level occurs at it and thus at the signal output A. When both input signals are at the logical 0 level, then the transistors T2 and T4 are conductive so that a current of equal size flows through each of the two resistors R1 and R2 and the mean potential corresponding to the 0 level appears at the signal output A. This status also results when the one level is present at both inputs since the transistors T1 and T3 are conductive in this case and a current of approximately identical size likewise flows through each of the two resistors R1 and R2.

The time-delay element V has a delay corresponding to a bit duration of the binary signals. When a signal in the differential binary code appears at the output terminal E of the pseudo-random sequence generator PNG, then this signal appears practically simultaneously at the first input E1 and appears one bit duration later at the second input E2. This results in a corresponding changeover of the differential amplifier arrangement. A change of potential, for example from 0 to 1 at the terminal E, thus leads directly to a positive one level at the output terminal A and leads to a signal with negative one level at this terminal one bit duration later. When binary quasi-random sequences are generated by the pseudo-random sequence or number generator PNG, then quasi-random sequences which exist in AMI code also result at the output terminal A. An interchange of the two input terminals E1 and E2, just like the interchange of the two output terminals A and $\overline{A}$, leads to an inverse output signal.

Figure 2:
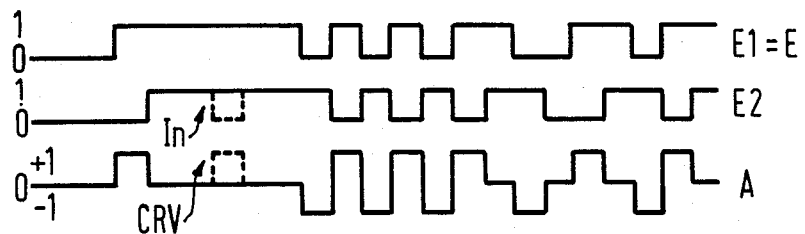
FIG. 2 shows a pulse diagram referring to the arrangement according to FIG. 1.

As a result of the terminal P, individual pulses can be supplied to the exclusive OR element EXOR, said pulses leading to an inversion of the logical level pending at the other input terminal E2. The upper line in FIG. 2 illustrates a binary pulse sequence in NRZ format which is emitted by the pseudo-random sequence generator PNG at the terminal E. The center line of FIG. 2 illustrates the signal present at the second input E2 of the differential amplifier arrangement. It turns out that this signal corresponds to the output signal of the pseudo-random sequence generator, however shifted by one bit duration. Illustrated in the lower line is the pseudo-ternary signal appearing at the output terminal A. An inversion In is illustrated with broken lines in the center line, said inversion In having been generated in the signal at the input terminal E2 by means of an input pulse at the terminal P. Without this inversion, the logical 1 level would be present at the two inputs E1 and E2 of the differential amplifier arrangement and thus the logical 0 level would have been generated at the output terminal A. If the logical 0 level is generated due to the inversion at the input terminal E2, then the logical 1 level is thus generated at the output terminal A, said logical 1 level following a logical 1 pulse and thus representing a coding rule infraction CRV. It thus turns out that a coding rule infraction appears at the output side due to the inversion of a single bit in the exclusive OR element.

When a plurality of directly successive bits are inverted, then the number of coding rule infractions can be less than the number of mixed-in inversions. Thus, for example, given inversion of two directly successive bits, on the average only 50% of the errors or faults in the output signal appear as coding rule infractions. The number of coding rule infractions becomes lower because, among other things, the inversion has also converted two successive statuses in the AMI code, for example $+1/-1$ or $-1/+1$ into the status 0/0. The errors contained in the quasi-random sequence emitted at the output side are not effective as coding rule infractions in this case. When more than two directly successive bits are inverted, then the relative proportion with which these errors appear as coding rule infractions further decreases.

Figure 1A:
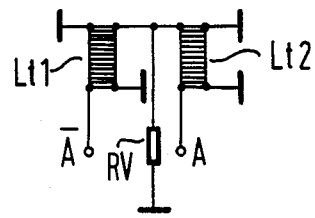

A higher output power is required for the transmission of the quasi-random sequences in AMI code with mixed-in coding rule infractions over a connected line than is required for the pure test mode in an intermediate location. For this case, a modification of the sample embodiment is illustrated in FIG. 1a, this modification containing a line transformer. This line transformer known per se is designed as a symmetrical/asymmetrical 4:1 line transformer. The line transformer contains two two-wire lines Lt1 and Lt2 of equal length, whereby the first two-wire line Lt1 is wound on a highly permeable core. The first lead of the first two-wire line Lt1 has a first terminal at one end which is connected to the terminal $\overline{A}$ for the inverse output signal, whereas the other terminal of the first lead is connected to reference potential. The first terminal of the second lead of the first two-wire line Lt1 which is adjacent to the first terminal of the first lead is connected to the reference potential, whereas the second terminal of the lead is connected to the first lead of the second two-wire line Lt2 and, over a shared load resistor RV, is connected to reference potential. The second terminal of the first lead of the second two-wire line Lt2 is connected to the terminal A for the output signal, whereas the second lead of the second two-wire line Lt2 is connected to reference potential at its two end points. The inputs of the lines lie in series at that side of the line transformer facing the differential amplifier arrangement, whereas the outputs of the lines are connected in parallel at the asymmetrical side facing the load resistor. An increase of the output power results since the powers which appear separately at the two resistors R1 and R2 given the sample embodiment according to FIG. 1 are available at one output terminal. In addition to this combination of the powers, a step-up transformation of the asymmetrical load resistor RV also results. This load resistor can, for example, represent a following coaxial cable with a characteristic impedance of 75 ohms. The load resistors R1 and R2 are connected symmetrically at ground. A further power increase due to the line transformer results since the collector voltage for the connected transistors can be supplied without significant dc voltage drop.

A further increase of the output power given an improvement of the edge steepness of the generated signals is possible since the two differential amplifiers of the differential amplifier arrangement are driven push-pull upon elimination of the reference voltage source. An improvement of the edge steepness is further possible since the collector capacitance of the transistors—increased in the present case due to the parallel connection of two collectors—is compensated by a series inductance in the collector circuit.

Although various minor changes and modifications might be proposed by those skilled in the art, it will be understood that I wish to include within the claims of the patent warranted hereon all such changes and modifications as reasonably come within my contribution to the art.

I claim as my invention:

1. An arrangement for generating quasi-random sequences in AMI code, comprising:
   generator means for creating binary quasi-random sequences;
   a differential amplifier arrangement comprising first and second differential amplifiers, the first differential amplifier having first and second transistors and a first input, the second differential amplifier having third and fourth transistors and a second input;
   an exclusive OR gate (EXOR) having two inputs and an output, the one input being connected to an output of the generator means and the other input connecting to a control terminal;
   the output of the exclusive OR gate being connected over a time-delay element to the second input of the differential amplifier arrangement;
   the first differential amplifier, first and second transistors having their emitters connected to one another and to an operating voltage via a first current source, a base of the first transistor connecting to the first input of the differential amplifier arrangement, the base of the second transistor connecting to a reference voltage source, a collector of the first transistor connecting to an inverse output and also via a first resistor to a reference potential, the collector of the second transistor connecting to a signal output and also via a second resistor to the reference potential;
   the second differential amplifier, third and fourth transistors having their emitters connected to one another and via a second current source are connected to said operating voltage, the collector of the third transistor connecting to the collector of the second transistor, the collector of the fourth transistor connecting to the collector of the first transistor, the base of the fourth transistor connecting to the base of the second transistor, and the base of the third transistor connecting to the second input of the differential amplifier arrangement.

2. An arrangement according to claim 1 wherein the first, second, third, and fourth transistors are NPN type.

3. An arrangement according to claim 1 wherein the time-delay element comprises an electronic circuit.

4. An arrangement for generating quasi-random sequences in AMI code, comprising:
   generator means for creating binary quasi-random sequences;
   a differential amplifier arrangement comprising first and second differential amplifiers, the first differential amplifier having first and second transistors and a first input, the second differential amplifier having third and fourth transistors and a second input;

an exclusive OR gate (EXOR) having two inputs and an output, the one input being connected to an output of the generator means and the other input connecting to a control terminal;

the output of the exclusive OR gate being connected over a time-delay element to the second input of the differential amplifier arrangement;

the first differential amplifier, first and second transistors having their emitters connected to one another and to an operating voltage via a first current source, a base of the first transistor connecting to the first input of the differential amplifier arrangement, the base of the second transistor connecting to a reference voltage source, a collector of the first transistor connecting to an inverse output, the collector of the second transistor connecting to a signal output;

the second differential amplifier, third and fourth transistors having their emitters connected to one another and via a second current source are connected to said operating voltage, the collector of the third transistor connecting to the collector of the second transistor, the collector of the fourth transistor connecting to the collector of the first transistor, the base of the fourth transistor connecting to the base of the second transistor, and the base of the third transistor connecting to the second input of the differential amplifier arrangement; and a single load resistor connecting to a line transformer, said line transformer comprising two two-wire lines of equal length, the first two-wire line being wound on a highly permeable core and one end of a first lead of the first two-wire line being connected at one side to the inverse output and is connected at the other side to the reference potential, a second lead of the first two-wire line being connected to the reference potential at one end and is connected to the single load resistor at the other end as well as to one end of a first lead of the second two-wire line, the first lead of the second two-wire line being connected at its other end to the signal output, and ends of the second lead of the second two-wire line being connected to reference potential.

* * * * *